(12) United States Patent
Erickson et al.

(10) Patent No.: US 7,003,589 B2
(45) Date of Patent: Feb. 21, 2006

(54) METHOD AND ARRANGEMENT FOR GENERATING UNIQUE IDENTIFIERS FOR LOGICAL UNITS OF SCSI DEVICES

(75) Inventors: Shawn Carl Erickson, Santa Barbara, CA (US); David P. Cox, Santa Barbara, CA (US); Nick Edward Demmon, Oxnard, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/260,415

(22) Filed: Oct. 1, 2002

(65) Prior Publication Data

US 2004/0064596 A1 Apr. 1, 2004

(51) Int. Cl.
G06F 3/00 (2006.01)
(52) U.S. Cl. .................. 710/8; 710/3; 710/62; 710/74; 711/114
(58) Field of Classification Search .............. 710/3, 710/8, 62, 74; 711/114
See application file for complete search history.

(56) References Cited

U.S. PATENT DOCUMENTS

| | | | | |
|---|---|---|---|---|
| 6,065,087 | A * | 5/2000 | Keaveny et al. ............. 710/51 |
| 6,243,774 | B1 * | 6/2001 | Eide et al. .................. 710/302 |
| 6,625,703 | B1 * | 9/2003 | Goodman et al. .......... 711/162 |
| 6,697,924 | B1 * | 2/2004 | Swank ....................... 711/163 |
| 6,792,479 | B1 * | 9/2004 | Allen et al. ................. 710/10 |
| 2002/0162010 | A1 * | 10/2002 | Allen et al. ................. 713/200 |
| 2003/0065684 | A1 * | 4/2003 | Goodman et al. .......... 707/200 |

OTHER PUBLICATIONS dpANS, Project T10/1236-D, Revision 20, Jul. 18, 2001, Information technology, SCSI Primary Commands—2 (SPC-2), pp. 208-215.*
draft-ietf-ips-isci-disc-reqts-00.txt, Jan. 2001, iSCI Naming and Discovery Requirements.*

* cited by examiner

Primary Examiner—Kim Huynh
Assistant Examiner—Alan S. Chen

(57) ABSTRACT

In the method, a logical unity is queried with a first command requesting first identifier data, to determine whether a unique identifier (UID) for the logical unit can be constructed based on the first identifier data. If a UID cannot be constructed from the first identifier data, the logical unit is queried with a second command requesting second identifier data, to determined if a UID can be constructed based on the second identifier data. If a UID cannot be constructed based on the second identifier data, the logical unit is queried with a third command requesting third identifier data. Information is extracted from the first identifier data and from the third identifier data and a UID is generated based on the extracted information.

40 Claims, 7 Drawing Sheets

US 7,003,589 B2

METHOD AND ARRANGEMENT FOR GENERATING UNIQUE IDENTIFIERS FOR LOGICAL UNITS OF SCSI DEVICES

BACKGROUND OF THE INVENTION

1. Field of the Invention

The present invention relates to the generation of unique identifiers for logical units of SCSI devices using SCSI command sets.

2. Related Art

Current electronic and computing systems typically comprise many different devices that electronically communicate with each other over some type of bus or network. These devices require suitable interfaces in order to be connected to one another (e.g., via a suitable bus) for establishing and conducting communications, such as over a bus network for example. The most popular processor-independent standard is the small computer system interface (SCSI) standard, which connects components via a parallel bus for system-level interfacing between a computer and intelligent devices such as hard disks, floppy disks, CD ROMs, printers, scanners and other types of media devices or storage devices. SCSI can connect multiple devices to a single adaptor (e.g., a host bus adapter (HBA) or port) on a SCSI bus. SCSI standard devices transfer bits in parallel and can operate in either asynchronous or synchronous modes. The synchronous transfer rate may be up to 5 MB/s, for example.

SCSI-2 is version of the SCSI command specification, which shares the original SCSI's asynchronous or synchronous modes and adds a "fast SCSI" mode (<10 MB/s) and "Wide-SCSI" (16 bit, <20 MB/s or rarely 32 bit). SCSI-2 was added since the original SCSI was minimalistic in terms of the definition of command sets for different device classes. SCSI-2 allows scanners, hard disk drives, CD ROM drives, tapes and many other devices to be connected. SCSI-3 is an ongoing standardization effort to extend the capabilities of SCSI-2. SCSI-3's goals are more devices per bus (up to 32), faster data transferred, greater distances between devices (e.g. longer cables), more device classes and more command sets, structured documentation and a structured protocol model. Accordingly, SCSI now represents a family of SCSI standards, including standards directed to the SCSI architecture model, implementation standards, device-type specific command sets and shared command sets, SCSI protocols and interconnect standards.

With the increase in the number of different SCSI devices and SCI command sets, a SCSI bus or SCSI device must be able to uniquely identify another SCSI device in order to receive a transmission from that device. These unique identifiers require global uniqueness, and must be identified with a technique that is commonly used throughout the world. Accordingly, as part of the shared command set standard, industry groups developed a SCSI Primary Commands-2 (SPC-2) document which provides SCSI primary command standards that are designed to be used industry wide. In this document, a standardized inquiry vital product data (VPD) page has been defined that may contain various identifiers with different characteristics for a SCSI device being addressed, and/or for a logical unit (e.g., addressable blocks of storage created from one or more disks contained within a SCSI device, which may provide a unique connection to an application program or another SCSI device) being addressed on a SCSI device. This page is called a Device Identification VPD Page (hereinafter "VPD 83h page").

Previously, unique identification of SCSI devices had been difficult and confusing, as there was no lack of basic mechanisms for this purpose in the SCSI standards. However, for devices that support VPD page 83h, a SCSI host device (e.g., a host bus) may be able to generate a unique logical unit identifier (UID) for a logical unit on another SCSI device (e.g. storage device) within a network. However, this too has limitations, since this kind of identification is currently limited to SCSI devices that support VPD 83h, and only to those SCSI devices having a VPD 83h payload which actually provides a globally unique identifier (e.g., within a field of the VPD page 83h). Accordingly, there is currently no UID generation process for a SCSI device that supports VPD 83h, but does not return a VPD 83h payload that contains an identifier considered to be a globally unique identifier. Further, the above technique cannot be utilized for SCSI devices (devices which are pre-SCSI-3 devices, for example) that do not support VPD 83h.

SUMMARY OF THE INVENTION

The method and arrangement of the present invention generate a unique identifier for a logical unit of a SCSI device on a network. In the method, a logical unit is queried with a first command requesting first identifier data, to determine whether a unique identifier (UID) for the device can be constructed based on special device specific logic. If a UID cannot be constructed from the first identifier data, the logical unit is queried with a second command requesting second identifier data, to determine if a UID can be constructed based on the second identifier data. If a UID cannot be constructed based on the second identifier data, the logical unit is queried with a third command requesting third identifier data. Information is extracted from the first identifier data, second identifier data and from the third identifier data or from the first and third identifier data if certain criteria are matched and a UID is generated based on the extracted information.

BRIEF DESCRIPTION OF THE DRAWINGS

The present invention will become more fully understood from the detailed description given here and below and the accompanying drawings which are given by way of illustration only, and thus are not limitative of the present invention, and wherein.

DETAILED DESCRIPTION

Figure 1A:
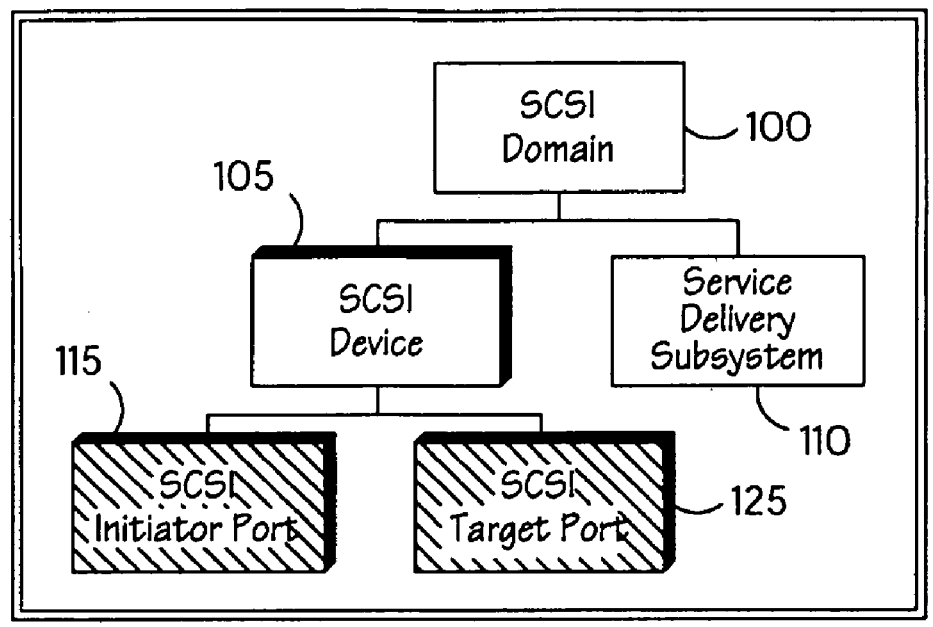
FIG. 1(a) illustrates a hierarchy diagram representing a SCSI domain in an accordance with an exemplary embodiment of the present invention.

The method and arrangement in accordance with the invention generates a globally unique identifier (UID) for logical units of those SCSI devices that (a) support a Device Identification Vital product Data Page (hereinafter referred to as "VPD 83h page") but do not provide a VPD 83h page payload that includes an identifier that is considered to be globally unique; and (b) SCSI devices that do not support a VPD 83h page. In accordance with one embodiment, scanning logic of the VPD 83h page is adjusted to allow construction of a globally unique identifier (UID) from a non-globally unique identifier that was provided in a VPD 83h page payload received from a logical unit of a SCSI target device in response to a SCSI command issued from a SCSI initiator device. The VPD 83h page payload contains a list of identification descriptors, each identification descriptor having an identifier type.

For logical units that return an VPD 83h payload that does not contain a globally unique identifier, the method and arrangement in accordance with the invention attempt to generate, or "build" a globally unique identifier. For example, in response to a request for a UID from an application client running on the SCSI initiator device, a logical unit UID generation library (LU-UID library) selects a "best" identifier type to be used for forming an eventual unique identifier.

To determine a best identifier, each identifier in an identifier descriptor list in the VPD 83h payload is scanned. The identifier having the highest numerical (hexadecimal) value is determined to be an identifier that may be used to generate the UID. To transform this "best" identifier into a globally unique identifier, the LU-UID library additionally issues SCSI commands requesting a standard inquiry page and requesting a unit serial number vital product data (VPD) page (hereinafter "VPD page 80h"), since data from these pages may be used in generating a UID.

From data in the received standard inquiry page payload, the LU-UID library determines if data in the payload indicates that there is a match to a specialized identifying method, described in further detail below, that the LU-UID library knows is specific to the logical unit or the SCSI device that publishes the logical unit. If the LU-UID library finds a match, then the LU-UID library can call the specialized method to generate a UID, to be forwarded the requesting application. If no match is found, the LU-UID library stores vendor identification, product identification, product revision level and peripheral device type data associated with the logical unit from the standard inquiry page in temporary storage (e.g., buffer cache such as system RAM) for later use in the UID generation process.

If no match is found and VPD 83h page does not contain a globally unique identifier, the LU-UID library extracts product serial number data from the received unit serial number VPD page and concatenates the cached vendor identification, product identification, product revision level and peripheral device type data associated with the logical unit from the standard inquiry page. This data is then concatenated to the "best" identifier found in the identification descriptor list of the VPD 83h page payload, in order to construct a globally unique identifier, which is then forwarded to the requesting application so that the application, running on an SCSI initiator device, may identify the logical unit on the SCSI target device.

In another embodiment, and for SCSI devices that do not support a VPD 83h page, the LU-UID library issues a SCSI inquiry command requesting standard inquiry page from an addressable logical unit on a SCSI target device, as in the first embodiment. If a specialized identifying method is not found based on the standard inquiry page payload, the LU-UID library issues a second SCSI command requesting the VPD 83h page to the same logical unit over the same SCSI path as before. However in this instance, a VPD 83h page payload is not returned. Accordingly, the LU-UID library checks the peripheral device type, extracted from the standard inquiry page, to determine if the SCSI device, the device publishing the logical unit, can be classified as what is known as a single logical unit number (single LUN) device. In other words, it is determined whether or not the SCSI device supports only a single logical unit.

If the device is classified as a single LUN device (e.g., there is a single logical unit on the SCSI device, hence a single LUN) the LU-UID library issues a SCSI inquiry command requesting the unit number serial vital page data page 80h and the VPD page 80h identifier data is considered by the LU-UID library to present sufficient identifier data in order to generate a globally unique identifier using additional information. Whether a logical unit is connected to a single device (e.g., single LUN) can be determined from a peripheral device type in the standard inquiry page payload. As in the first embodiment, the LU-UID library extracts product serial number data from the received unit serial number VPD page and concatenates the cached vendor identification, product identification, product revision level and peripheral device type data associated with the logical unit from the standard inquiry page.

The extracted data is used to generate a globally unique identifier for the logical unit, which is then forwarded to the requesting application so that the application, running on an SCSI initiator device, may identify the logical unit on the SCSI target device. Accordingly, the method and arrangement to be hereafter described in further detail below enables the generation of globally unique identifiers for SCSI devices that either do not contain unique identifier data in a supported VPD 83h page or do not support the VPD 83h page at all (e.g., all pre-SCSI-3 devices). However, before describing the features of the invention in greater detail, the inventors offer a general discussion on the SCSI architectural model utilized in the present invention, in order to aid the understanding of the invention. The model is similar to what is described in the document Information technology—SCSI Architecture Model-2 (SAM-2).

As used herein, the term "device" may at times refer to any of one or more SCSI devices, SCSI initiator device, SCSI target device, storage device (e.g., SCSI target device) and/or a logical unit that represents a SCSI device. A logical unit may be embodied ad addressable blocks of storage created from one or more disks (also called disk spindles) of a SCSI target device. A logical unit may provide a unique connection to an application program or to another SCSI device.

FIG. 1(a) illustrates a hierarchy diagram representing a SCSI domain in accordance with an exemplary embodiment of the present invention. A domain is made up of SCSI devices and a service delivery sub-system that transports commands and data between the devices. A SCSI device contains application clients, device servers, or both and the infrastructure to support them. In FIG. 1(a) through FIG. 4, components may at times be described in terms of objects using a hierarchy diagram. Objects, as are known in the computer literature, represent architectural abstractions or containers that encapsulate data types, services or other objects that are related in some way.

In FIG. 1(a), labeled boxes denote the objects and the composition and relation of one object to other objects are shown by the connecting lines. In this case, the connecting lines indicate the relationship between the domain object 100 and its constituent objects, SCSI device 105 and service delivery sub-system 110. Similarly, connecting lines show that the SCSI device 105 contains the objects SCSI initiator port 115 and SCSI target port 125.

The hierarchy diagram also shows multiple instances of an object by the presence of a shadow, as is the case for the SCSI initiator port 115 and SCSI target port 125 objects and SCSI device 105 object. Light diagonal lines indicate objects that are optional, as is the case for the SCSI initiator port 115, and SCSI target port 115 objects. The above conventions may also be used in the descriptions of FIGS. 1–4, where applicable.

Accordingly, a SCSI domain is composed of at least one SCSI device 105, at least one target port 115 and at least one initiator port 125 interconnected by a service delivery sub-system 110. The SCSI device 105 is an object that originates or services SCSI commands. As mentioned previously, when a SCSI device originates a command it is called a SCSI initiator device, and that command is transmitted through what is called an initiator port (e.g., host bus adaptor, SCSI adaptor or adaptor) or a SCSI target/initiator port (e.g., a SCSI device may be both an SCSI target device and a SCSI initiator device and have one or more SCSI initiator/target ports). A SCSI device containing logical units (LUs) that service the commands is called a SCSI target device, and receives commands through a SCSI target port or a SCSI target/initiator port. The service delivery sub-system 110 connects all the SCSI ports in the SCSI domain, providing a sub-system through which application clients and device servers (to be discussed in further detail hereafter) communicate.

Figure 1B:
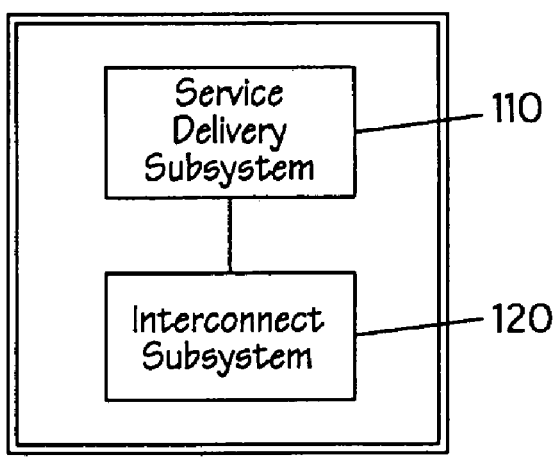
FIG. 1(b) illustrates a service delivery sub-system in accordance with an exemplary embodiment of the invention.

FIG. 1(b) illustrates a service delivery sub-system 110 in accordance with an exemplary embodiment of the invention. The service delivery sub-system 110 connects SCSI ports and is composed of an interconnect sub-system 120. The interconnect sub-system 120 is a set of one or more physical interconnects that appear to a client or server as a single path for the transfer of requests, responses and data between SCSI devices. The service delivery sub-system 110 may be physically embodied as a bus or network, such as a storage area network for example.

Figure 2A:
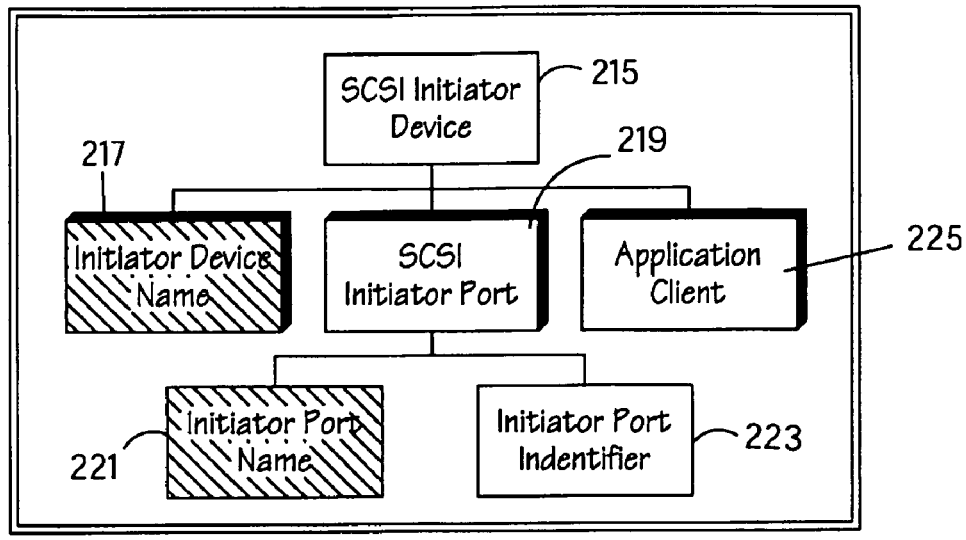
FIGS. 2(a) to 2(c) illustrate SCSI devices in accordance with an exemplary embodiment of the invention.
Figure 2B:
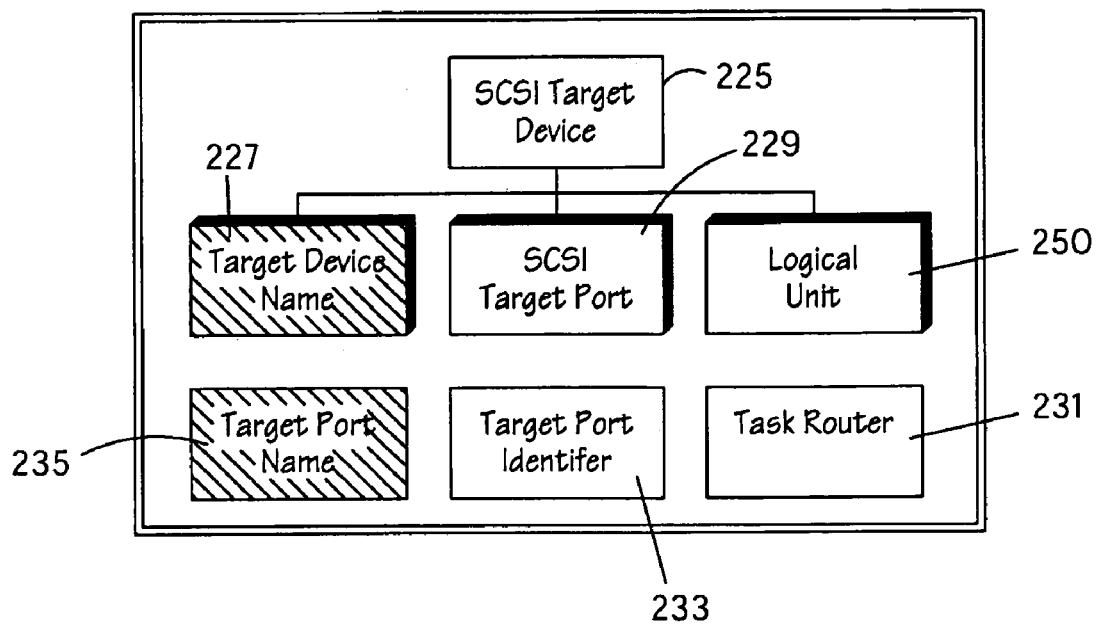
Figure 2C:
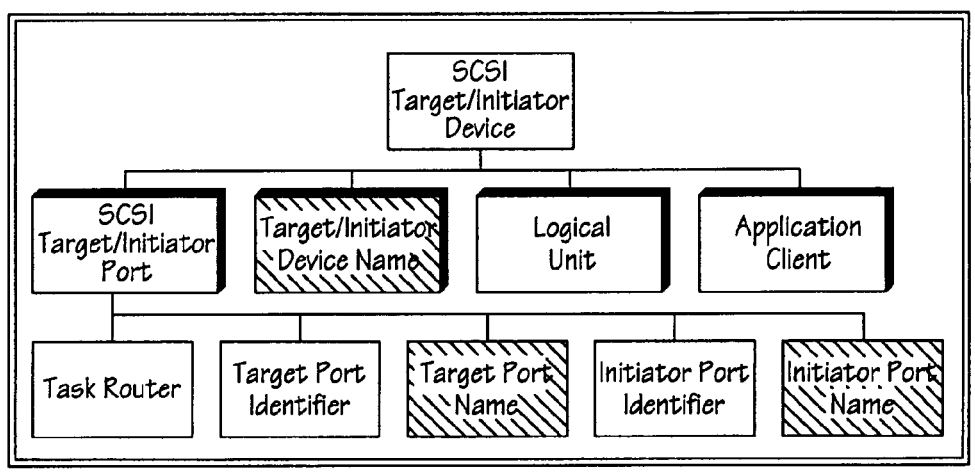

FIGS. 2(a) through 2(c) illustrate SCSI devices in accordance with an exemplary embodiment of the invention. A SCSI device is a SCSI target device, a SCSI initiator device or a SCSI target/initiator device. Physically, a SCSI device may be embodied as any of hard disks, floppy disks, CD ROMs, printers, scanners, RAID arrays and other types of media devices or storage devices.

FIG. 2(a) illustrates a SCSI initiator device 215. The SCSI initiator device 215 may contain zero or more initiator device names 217, one or more SCSI initiator ports 219, each containing an initiator port identifier 223 and an optional initiator port name 221, and zero or more application clients 240. An initiator port identifier 223 is a value that is the SCSI port identifier for the initiator port 219. An initiator device name 217 is a name, or a label of an object that is unique within a specified context and should never change e.g., a world-wide identification (WWID) for example. A SCSI initiator device 215 shall have no more than one initiator device name 217 for each supported SCSI protocol. An initiator port name 221 is the SCSI port name (e.g., WWID) for the initiator port. An application client 225 is the source of SCSI commands and task management functions. A given application client can be the source for multiple concurrent SCSI commands but usually only one task management function at a time.

FIG. 2(b) illustrates a SCSI target device 225 in accordance with an embodiment of the invention. A SCSI target device 225 contains zero or more target device names 227, one or more SCSI target ports 229 each containing a task router 231, SCSI target port identifier 233, and an optional target port name 235, and one or more logical units 250. The SCSI target port identifier 233, target device name 227 and target port name 235 are similar to that described above for the SCSI initiator device. The task router 231 routes commands and task management functions between the service delivery sub-system 110 and the appropriate logical unit's task manager. As described above, a logical unit 250 acts as a target-object to which SCSI commands are addressed.

As described briefly above, a SCSI target/initiator device 225+215 combines the SCSI target device 225 and SCSI initiator device 215 from FIGS. 2a and 2b, as is illustrated in FIG. 2(c). As the objects for each have been adequately described above, a detailed explanation as pertaining to FIG. 2(c) is omitted.

Figure 3:
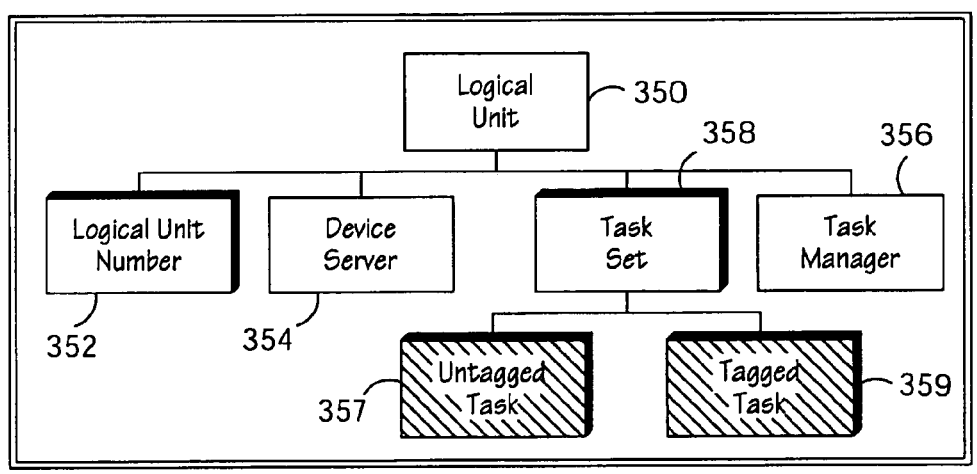
FIG. 3 illustrates a logical unit in accordance with an exemplary embodiment of the invention.

FIG. 3 illustrates a logical unit in accordance with the exemplary embodiment of the present invention. As illustrated in FIG. 3 a logical unit 350 contains zero or more logical unit numbers (LUN) 352, a device server 354, a task manager 356 and one or more task sets 358. The LUN 352 is a field containing up to 64 bits that identifies the logical unit within a SCSI target device, potentially within the context of SCSI target port. A given logical unit may be mapped out of any number of ports, or multiple times from the same port of a SCSI target device. This mapping is effected via the logical unit's LUN, which is typically a port relative number.

A device server 354 is an object that processes the operations requested by the SCSI commands received by the target SCSI device. The task manager 356 controls the sequencing of one or more tasks within the logical unit 350. There is one task manager 356 per logical unit 350. The task set 358 is composed of zero or more untagged tasks 357 or a combination of zero or more tagged tasks 359 and zero or more untagged tasks 357. A detailed discussion the functions of the task sets 358 and tasks 357, 359 is omitted as these objects are not a focus of this invention.

Figure 4A:
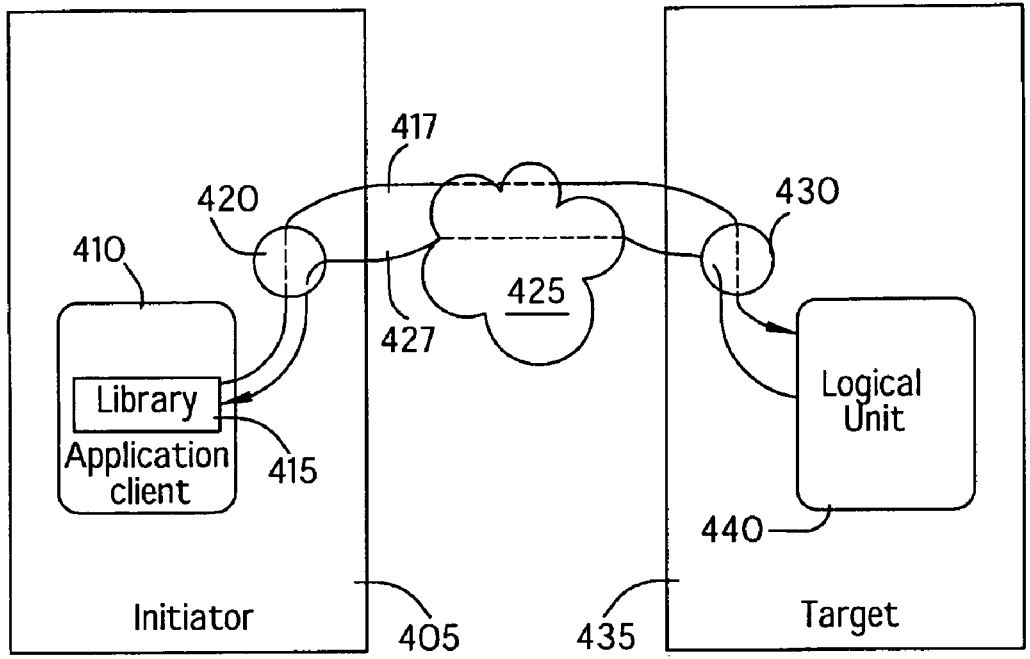
FIGS. 4(a) and 4(b) illustrate arrangements to perform the method in accordance with exemplary embodiments of the invention.
Figure 4B:
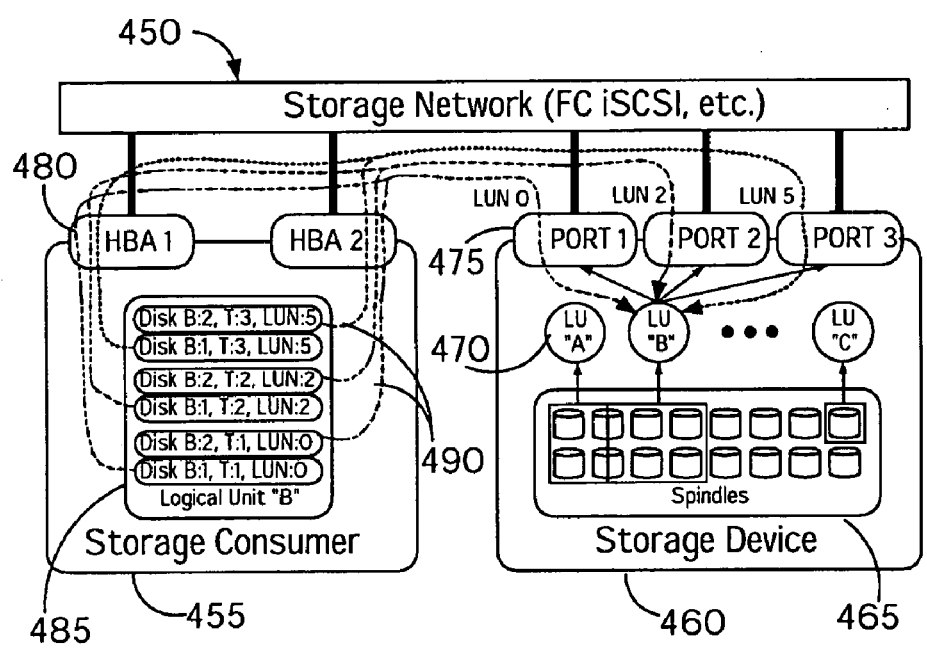

FIGS. 4(a) and 4(b) illustrate exemplary arrangements for performing the method and accordance with an embodiment of the invention. Referring to FIG. 4(a), there is a SCSI initiator device 405, which includes an application client 410 and initiator port 420, it being understood that the SCSI initiator device 405 may include a plurality of application clients and initiator ports 420. The SCSI initiator device 405 also includes a logical unit unique identifier generation library 415. Library 415 may be embodied as a code arrangement of compiled codes that perform a plurality of functions or processes, for example.

One or more application clients 410 request the library 415 to attempt to generate a LU-UID for a logical unit over a specified path and the library in turn issues SCSI commands over the specified SCSI path 417 to a SCSI target device 435 via the initiator port 420 (e.g., connection between an application client and a service delivery sub-system) that defines one end point in the path and via service delivery sub-system 425, which may be a bus and/or a network such as a storage area network (SAN), for example. The commands are routed by the service delivery subsystem 425 to the target port 430 (e.g., connecting a device server/task manager of SCSI target device with a service delivery subsystem) that defines the other end point in the path to an appropriate logical unit 440. Multiple paths may exist between the SCSI initiator 405 to a given SCSI logical unit 440; this will be explained in more detail in later paragraphs.

In response to the command, the logical unit 440 forwards a response over a SCSI path 427, which may be the exact same path over which the SCSI command was received. The response will go over a path that contains the same end points (420 and 430) but the routing through the service delivery subsystem 425 can vary, depending on which of any intermediate path elements are used (the service delivery subsystem can be comprised of multiple and varied interconnect devices). The response, which may be a payload of page data that was requested by the SCSI command, is routed via target port 430 and service delivery sub-system 425, to be received at the initiator port 420, which is mapped to the application client 410 of the SCSI initiator device 405. The generation of SCSI commands from application client 410 to logical unit 440, and returned payload from logical unit 440 to application client 410, via service delivery sub-system 425, provides the data that is to be used in order to build or generate a globally-unique identifier for the logical unit 440 on the SCSI target device 435.

In a preferred embodiment, the arrangement may be configured as illustrated in FIG. 4(b), which illustrates a mythical storage area network (SAN) 450. SAN 450 consists of a single storage consumer 455 (e.g., a host bus, a host computer, server, etc.) and a storage device 460 (e.g., RAID array, etc.); however, the present invention is envisioned for storage networks of any size and any number of storage consumers/storage devices. These may represent the SCSI initiator and SCSI target devices described in FIG. 4(a). SAN 450 may also be embodied as a SCSI bus or fibre channel (FC) fabric (e.g. frame switching network or arbitrated loop), for example.

Storage device 460 may contain a number of disk spindles 465 (or some type of storage medium such as flash RAM, tape, etc.) that the storage device 460 uses to persistently store data for consumers of the storage device (e.g., storage consumer 455). Storage device 460 publish internal storage to consumers by creating logical Units 470 of storage using various methods that match with the storage consumer 455's needs. For example, logical units 470 may be stripped across multiple spindles 465 to improve throughput, logical units 470 may be mirrored across multiple spindles 465 for data resiliency.

FIG. 4(b) illustrates shows three such logical units 470, labeled LU "A", "B", and "C" that are constructed from some number of disk spindles 465. One or more storage consumers 455 may access a particular LU by communicating requests to a port 475 on storage device 460 and tagging the request with a port relative address, this is the logical unit number or LUN. In FIG. 4(b), LU B may be mapped out of three different ports 475 (e.g., SCSI target ports or target ports) by the storage device 460.

If consumer 455 wants to use LU B (e.g., to access data contained in the logical unit which ultimately resides on one or more of the spindles 465) consumer 455 may access LU B by sending requests to Port 1 tagged with LUN 0, to Port 2 using LUN 2, or to Port 3 using LUN 5. This is an example of a storage device providing multiple paths to the same LU, which is commonly done for fault tolerance and/or improved bandwidth. Consumers of storage (hosts) can also have multiple connections into a SAN for the same reasons. Accordingly, in FIG. 4(b), storage consumer 455 represents a single host that has two connections to SAN 450, via Host Bus Adapters 480(HBA "1" & HBA "2"; these are synonymous to SCSI initiator ports).

The dotted lines in FIG. 4(b) represent the various SCSI paths 490 from the host consumer 455 through SAN 450 to LU B. From the perspective of the host consumer 455 (ignoring multi-pathing software or multi-pathing techniques, which is not a focus of the present invention), each SCSI path 490 appears to consumer 455 as an unrelated block of storage. Internally, the consumer 455's operating system (OS) will create named objects to represent the blocks of storage the OS discovered (represented as "Disk B:# T:# LUN:#"). In FIG. 4(b), the "host" (consumer 455) has six paths to LU B and has created six different OS objects that ultimately point to the same logical unit of storage. Block 485 denotes the fact that the contained named objects all related to the exact same logical unit, in this example LU B; however the storage consumer 455, without additional logic, cannot nominally discover this relationship. This may result in multiple instances of the same file system being mounted, each with its own local independent cache. This cache could result in file system and/or data corruption because of the uncoordinated access to the logical unit.

Figure 5:
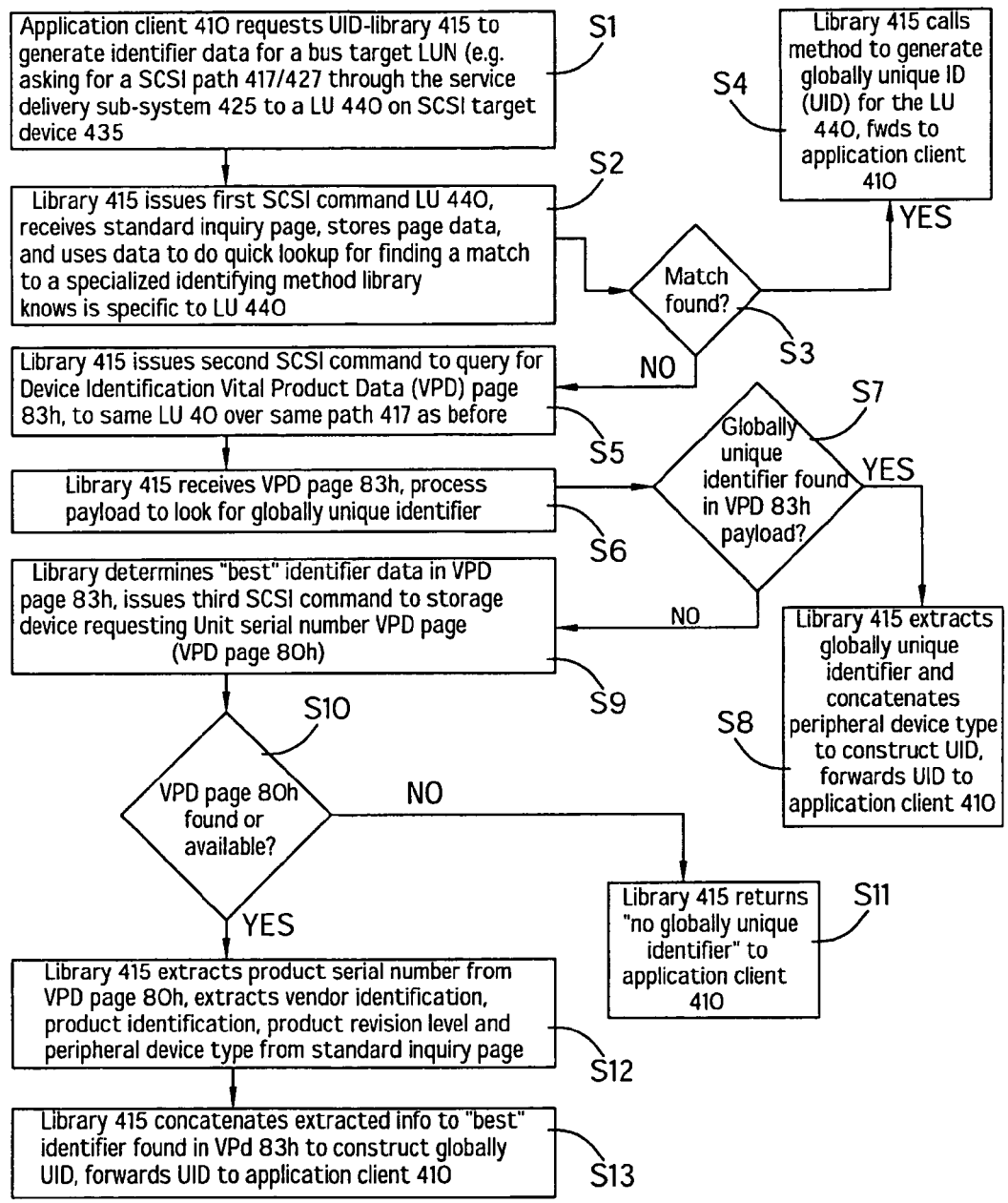
FIG. 5 illustrates a first embodiment of the method in accordance with the invention.

FIG. 5 illustrates a method in accordance with a first embodiment of the present invention. Referring to FIG. 5, initially an application client 410 on the SCSI initiator device 405 requests (Step S1) the library 415 to generate identifier data for a bus target LUN. A bus target LUN is an address that indicates a SCSI path through the service delivery sub-system (e.g., a storage network such as a fiber channel storage network or SCSI storage network, etc.) to a logical unit (e.g., logical unit 440) on a SCSI target device 435.

In order to satisfy the application client 410 request for a LU-UID, library 415 issues a SCSI inquiry command (Step S2) over the SCSI path, specified by the application client, to the logical unit 440, requesting a standard inquiry page. The SCSI inquiry command requests that information regarding parameters of the SCSI target device 435 and component logical unit 440 be sent from a device server (not shown) in the logical unit 440 to the application client 410. The command may be in the physical form of a command descriptor block (CDB), as is known. A CDB is a structure used to communicate a SCSI command from an application client to a device server on the logical unit. If the CDB includes data to trigger the sending of vital product data related to the logical unit 440, such as a one-bit enable vital product bit (EVPB), this specifies that the device server of the logical unit 440 shall return the vital product data page specified by a page or operation field code in the CDB.

In response to the SCSI inquiry command, the device server of the logical unit 440 forwards the standard inquiry page payload. The standard inquiry page payload may include data related to vendor identification, product identification, product revision level of the logical unit 440. For example, the vendor identification may be a field that contains eight (s) bytes of ASCII data identifying the vendor of the product (e.g. name of company such as "HP", "COMPAQ", etc.) The product identification may be a field that contains sixteen (16) bytes of ASCII data as defined by the vendor (e.g. name of product, such as "Array 2002", "SuperRAID", etc.) and the product revision level field may contain four (4) bytes of ASCII data as defined by the vendor. However, the present invention is not so limited to these field dimensions.

Additionally with respect to Step S2, the standard inquiry page payload also may include data that enables the library 415 to determine if there is a specialized identifying method that it knows is specific to the addressed logical unit 440. In general, a table (e.g., lookup table) compiled into the library 415 contains table entries. The table entries contain values to look for the in received standard inquiry payload (it allows wildcards). If a match is found then a function to use for UID generation is read out of the table entry and the method is called.

For example, library 415 contains an array of what is called DevMatchRecords (device match records). Each device match record may contain the following fields: starting offset, length of pattern (byte length), pattern (array of bytes) and function to call if a match is found. In general, matching logic iterates over this array and for each record, attempts to see if the record's match criteria happens to match the standard inquiry data. If a match is found, a function specified in the record is used to generate a UID.

The starting offset specifies the starting byte in the standard inquiry page payload that relates to the first byte in the pattern. Starting at this offset, the bytes in the payload and the pattern array are compared sequentially. If all compared bytes are the same (equivalent) for the length of the pattern, then the standard inquiry page payload is considered to match the device match record. Comparison logic also supports a wild card. If the wild card character is used, then the related byte in the standard inquiry page payload will be considered as equivalent. Thus, a single byte matches if the following is true:

(InquiryPayload[offset+$n$]=Pattern[$n$]) or (Pattern[$n$] =wildcard character)r;

where n is some whole number between n and 1 minus the length of the pattern array. The entire standard inquiry page payload matches the record if the above holds true for every byte in the pattern (letting n vary, continuously, from 0 to 1 minus the length of the pattern array). Accordingly, the library 415 stores the standard inquiry page data and the aforementioned fields and determines whether or not it finds a match to a specialized identifying method (Step S3).

If the library 415 finds a match, i.e., the output of step S3 is YES, the library 415 calls the specialized method described above (Step S4) to generate a globally unique identifier (UID) for the logical unit 440, and forwards the UID to the application client 410.

If no match is found (e.g., the output of Step S3 is NO), the library 415 issues a second SCSI inquiry command (Step S5). The second SCSI inquiry command (e.g., the CDB) includes the EVPB bit requesting the Device Identification Vital Product Data Page (VPD 83h). The command is sent to the logical unit 440 over the same SCSI path as before. The library 415 receives the VPD page 83h payload and processes the payload (Step S6) to look for a globally unique identifier (Step S7). VPD page 83h may include zero or more identification descriptors applying to the logical unit 440. Logical units may have more than one identification descriptor; therefore the payload may include a list of identification descriptor fields. Each identification descriptor field may contain information identifying the logical unit, physical device, or access path (SCSI path) used by the SCSI command and by the return parameter data (e.g., the page data). Each identification descriptor may have an identifier type field, which contains a description of the type of identifier present in the identification descriptor. This is where the library 415 may determine whether or not a globally unique identifier is present in the VPD page 83h payload.

If an identifier type field contains a unique identifier (output of Step S7 is YES), the library 415 constructs the UID by extracting the selected identifier from VPD page 83h and concatenating it with the cached peripheral device type collected from the standard inquiry payload (done in Step S2) and forwards the UID to the application client 410 (Step S8). If not (e.g. the output of Step S7 is NO) the library 415 scans (Step S9) each of the identifier types in each identification descriptor field present in the payload to determine a "best identifier" field in the VPD 83h payload.

In order to determine a best identifier, library 415 sequentially scans, starting with a first identifier, each identifier found in the VPD page 83h payload. If an identifier is marked as being port relative (e.g., the association field in page 83h does NOT equal 0h), that identifier is skipped and the next identifier sequential identifier is scanned. Otherwise a value (hexadecimal value) for the identifier is extracted from the identifier type, which is contained within one of the fields of the VPD page 83h payload. The identifier with the highest numerical (hexadecimal) value (taking the above criteria into account) is selected as an identifier type. If the highest type found is greater then 2h, that identifier is considered to be globally unique and is used as the UID. If the identifier hexadecimal value is less then 2h, the identifier is considered to be something that can be made into a UID. If no identifier is found that matches the above criteria, then the identifier information from VPD 83h cannot be used to generate a UID.

Additionally in Step S9, the library 415 issues a third SCSI inquiry command. This SCSI inquiry command also includes an EVPD bit requesting the logical unit 440 to forward a unit serial number VPD page (VPD 80h). The VPD 80h page may provide a product serial number for the target/SCSI target device 430 or logical unit 440. In particular, VPD 80h page may contain a product serial number field, which includes ASCII data that is a vendor-assigned serial number. If the VPD 80h payload is not found (output of Step S10 is NO), the library 415 returns an indication of "no globally unique identifier" to the application client 410 (Step S11). If the VPD 80h payload is returned (output of Step S10 is YES), the library 415 extracts the product serial number field (Step S12) from the VPD 80h payload, and also in Step S12 extracts one or more of the vendor identification data, product identification data, product revision level, and peripheral device type data from the standard inquiry page, which had been stored previously at Step S2.

With the aforementioned data, the library 415 may generate or build a globally unique identifier (Step S13). The library 415 concatenates the product serial number field and one or more of the vendor identification, product identification, product revision level, and peripheral device type fields from the standard inquiry page to the "best" identifier found in the VPD 83h page payload. The resultant identifier for the logical unit 440 is a globally unique identifier (UID) that is communicated to the application client 410 at the SCSI initiator device 405. Accordingly, a globally unique identifier may by generated for a logical unit that is independent of vendor, product, path and logical unit type (e.g. random access magnetic disk, sequential access magnetic tape, etc.) through a service delivery sub-system such as a storage network.

Figure 6:
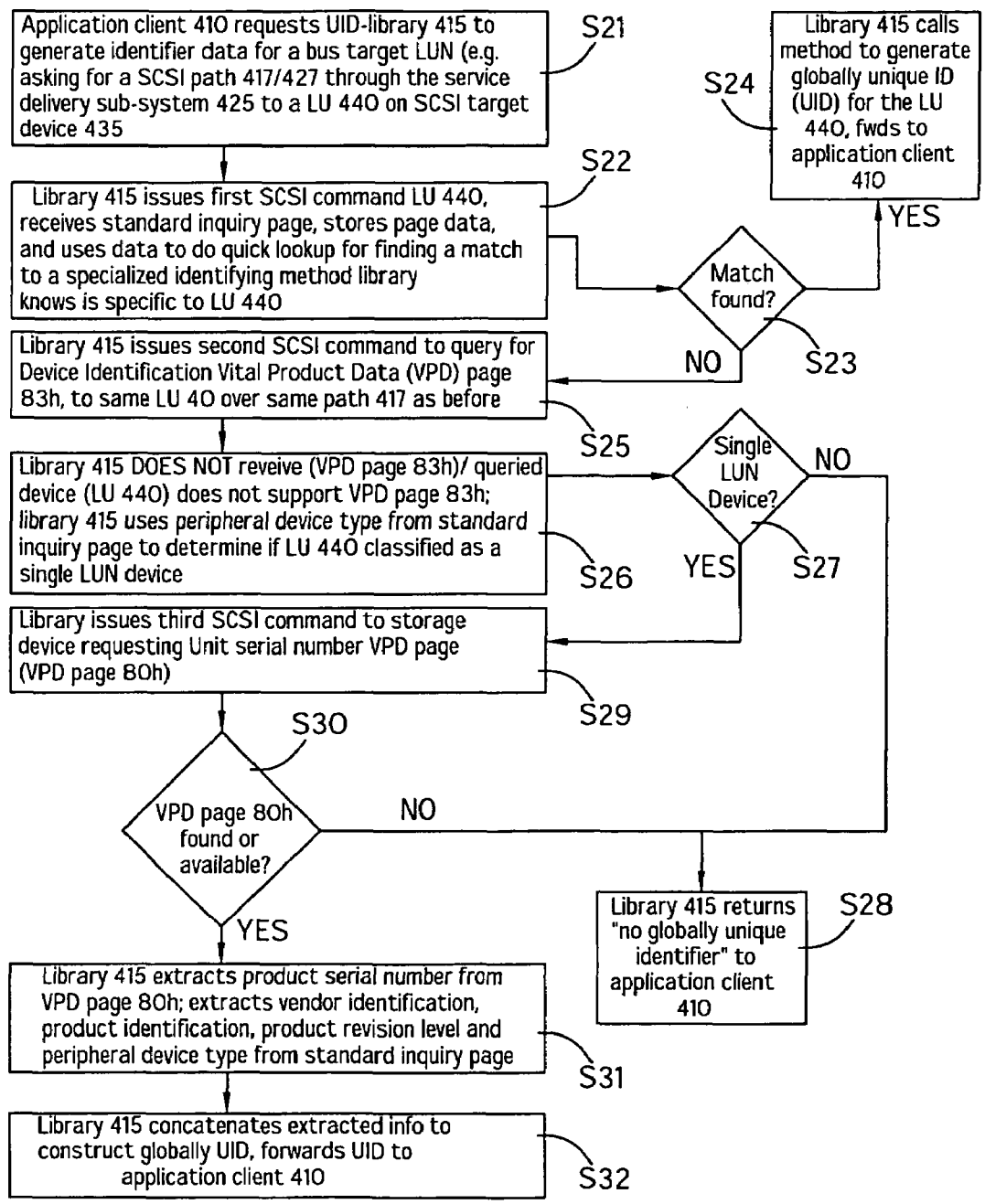
FIG. 6 illustrates a second embodiment of the method in accordance with the invention.

FIG. 6 illustrates another embodiment of the method in accordance with the invention. Steps S21–S25 and Steps S28, and S30–S32 in FIG. 6 mimic Steps S1–S5 and Steps S10–S13 in FIG. 5, therefore a detailed description of these steps is not repeated. However, in this embodiment (at Step S26), the library 415 does not receive a VPD 83h payload from the logical unit 440 (e.g., the logical unit 440 is a pre-SCSI 3 device that does not support the VPD 83h page). Accordingly, the library 415 will scan a peripheral device type of the cached standard inquiry page payload (page data stored in Step S22) to determine if the logical unit 440 is classified as a single LUN device. In other words, the library 415 is attempting to determine if the SCSI target device 435 supports a single logical unit 440.

The peripheral device type field in the standard inquiry page payload contains hexadecimal values that indicate whether or not the device is a single LUN device. For example, a logical unit is considered to front (e.g., represent) a single LUN device if the type matches the following exemplary hexadecimal values in Table 1 (these are values in accordance with current SCSI standards):

TABLE 1

| Value in peripheral device type field | Single LUN Device |
|---|---|
| 01h | Sequential Access Magnetic Device (tape device) |
| 08h | Medium Changed Devices (e.g., jukebox, robot) |
| 0Ch | Storage Array controller device (e.g., RAID) |

If the device is classified as supporting only a single logical unit (LUN) (YES at Step S27), the library 415 determines that the VPD 80h identifier data is sufficient to generate a globally unique identifier (UID). Accordingly, and similar to the previous embodiment, the vendor identification, product identification, product revision level and/or peripheral device type fields from the standard inquiry page are extracted and concatenated to the VPD 80h page identifier data (e.g., the product serial number field) to construct a global UID, which is then forwarded to the application client 410 at the SCSI initiator device 405 (Steps S32–S32). Otherwise (e.g., output of Step S27 is NO), the library 415 returns an indication of "no globally unique identifier" to the application client 410 (Step S28)

The invention having been thus described the invention may be varied in many ways. For example, the functional blocks in FIGS. 1–6 may be implemented in hardware and/or software. The hardware/software implementation may include a combination of processors, application service providers, application specific integrated circuits (ASICs) and/or articles of manufacture. The articles of manufacture may further include storage media and executable computer program. The executable computer program may include the instructions to perform the described operations. For example, the computer program may be a product that includes a computer-readable medium having computer program logic stored thereon for enabling a processor of the product to generate a unique identifier for a device on a network. The computer executable programs may also be provided as part of externally supplied propagated signals. Such variations are not to be regarded as a departure from the spirit and scope of the invention, and all such modifications as would be obvious to one skilled in the art are intended to be included within the scope of the following claims.

Of course, although several variances of the present invention are discussed herein, it is readily understood by those of ordinary skill in the art that various additional modifications may also be made to the present invention. Accordingly, the embodiments discussed herein are not limiting of the present invention.

What is claimed is:

1. A method for generating a unique identifier for one of a plurality of logical units on a small computer system interface (SCSI) device, comprising the steps of:

querying one of the plurality of logical units on the SCSI device with a first command requesting first identifier data;

determining whether a unique identifier (UID) for the queried logical unit can be constructed based upon the first identifier data, the UID distinguishing uniquely among the plurality of logical units on the SCSI device;

querying the logical unit with a second command requesting second identifier data, if the UID cannot be constructed from the first identifier data;

determining whether the UID for the queried logical unit can be constructed based on the second identifier data;

querying the logical unit with a third command requesting third identifier data, if the UID cannot be constructed from the second identifier data;

extracting information from the first identifier data and from the third identifier data; and generating the UID based on the extracted information.

2. The method of claim 1, wherein the step of querying the logical unit with the first command includes:

issuing a small computer system interface (SCSI) standard inquiry command requesting a standard inquiry data page.

3. The method of claim 1, wherein the step of determining whether a UID can be constructed based on any received first identifier data includes:

determining whether there is a match between the first identifier data to an applicable specialized method adapted to uniquely identify the logical unit; and generating the UID using the specialized method, if a match exists.

4. The method of claim 1, wherein the step of querying the logical unit with the second command includes:

issuing a small computer system interface (SCSI) standard inquiry command requesting a logical unit identification vital product data (VPD) page.

5. The method of claim 1, wherein the step of querying the logical unit with the third command includes:

issuing a small computer system interface (SCSI) standard inquiry command requesting a unit serial number vital product data (VPD) page.

6. The method of claim 1, wherein the step of extracting information includes:

extracting at least one or more of vendor identification data, product identification data and product revision level data of the logical unit from the first identifier data; and extracting unit serial number data of the logical unit from the third identifier data.

7. The method of claim 1, further comprising:

selecting an identifier from a list of identifiers in the second identifier data.

8. The method of claim 7, wherein the extracting information step further includes extracting at least one or more of vendor identification data, product identification data and product revision level data of the logical unit from the first identifier data, and extracting unit serial number data of the logical unit from the third identifier data.

9. The method of claim 8, wherein the step of generating the UID includes:

concatenating the extracted information from the first and third identifier data to the selected identifier.

10. The method of claim 1, further comprising:

selecting an identifier from a list of identifiers in the second identifier data.

11. The method of claim 10, wherein generating a UID further includes concatenating the extracted information to the selected identifier to generate the UID for the queried logical unit.

12. The method of claim 1, wherein the querying of the logical unit with the first, second and third commands, respectively, each includes requesting the logical unit only for data defined by the SCSI standard.

13. An arrangement for generating a unique identifier for one of a plurality of logical unit on a small computer system interface (SCSI) device, comprising:
    means for querying one of the plurality of logical units on the SCSI device with a first command requesting first identifier data;
    means for determining whether a unique identifier (UID) for the queried logical unit can be constructed based on any first identifier data received by the client, the UID distinguishing uniquely among the plurality of logical units on the SCSI device,
    the means for querying further querying the logical unit with a second command requesting second identifier data, if the means for determining concludes that the UID cannot be constructed from the first identifier data;
    the means for determining further determining whether the UID for the queried logical unit can be constructed based on the second identifier data, and
    the means for querying further querying the logical unit with a third command requesting third identifier data, if the means for determining concludes that the UID cannot be constructed from the second identifier data;
    means for extracting information from the first identifier data and from the third identifier data; and
    means for generating the UID based on the extracted information.

14. The arrangement of claim 13, wherein the means for determining whether a UID can be constructed based on any received first identifier data further includes:
    means for determining whether there is a match between the first identifier data to an applicable specialized method adapted to uniquely identify the logical unit, and
    means for generating the UID using the specialized method, if a match exists.

15. The arrangement of claim 13, wherein the first, second and third commands are small computer system interface (SCSI) commands.

16. The arrangement of claim 15, wherein the first command is a SCSI standard inquiry command requesting a standard inquiry data page from the logical unit.

17. The arrangement of claim 15, wherein the second command is a SCSI standard inquiry command requesting a logical unit identification vital product data (VPD) page from the logical unit.

18. The arrangement of claim 15, wherein the third command is a SCSI standard inquiry command requesting a unit serial number vital product data (VPD) page from the logical unit.

19. The arrangement of claim 13, wherein
    the information extracted from the first identifier data includes at least one or more of vendor identification data, product identification data and product revision level data of the logical unit, and
    the information extracted from the third identifier data includes unit serial number data of the logical unit.

20. The arrangement of claim 13, further comprising means for selecting an identifier from a list of identification descriptors in the second identifier data.

21. The arrangement of claim 13, wherein the means for generating further includes:
    means for concatenating the extracted information to the selected identifier.

22. The arrangement of claim 21, wherein
    the information extracted from the first identifier data includes at least one or more of vendor identification data, product identification data and product revision level data of the logical unit, and
    the information extracted from the third identifier data includes unit serial number data of the logical unit.

23. The arrangement of claim 22, wherein the means for generating further includes:
    means for concatenating the extracted information from the first identifier and the unit serial number data to the selected identifier.

24. The arrangement of claim 13, wherein the arrangement is a arrangement application on a host computer and the logical unit is a logical unit in an accessible storage logical unit.

25. The arrangement of claim 13, wherein the means for querying is operable to request the logical unit only for data defined by the SCSI standard.

26. A method for generating a unique identifier for one of a plurality of logical units on a small computer system interface (SCSI) device, comprising the steps of:
    querying one of the plurality of logical units on the SCSI device with a SCSI command requesting a standard inquiry page from the logical unit;
    storing data from the standard inquiry page, the data including at least one or more of vendor identification data, product identification data and product revision level data of the logical unit;
    determining whether there is an applicable specialized method available for generating a unique identifier (UID) for the queried logical unit based on the stored data, the UID distinguishing uniquely among the plurality of logical units on the SCSI device;
    querying the logical unit with another SCSI command requesting a logical unit identification vital product data (VPD) page from the logical unit, if no specialized method is available;
    querying the logical unit with a further SCSI command requesting a unit serial number vital product data (VPD) page from the logical unit, if a logical unit identification VPD page is not received from or supported by the logical unit;
    extracting a product serial number form the unit serial number VPD page; and
    generating the UID for the queried logical unit based on only the product serial number and at least one or more of vendor identification data, product identification data and product revision level data of the logical unit.

27. The method of claim 26, wherein the step of generating further includes:
    concatenating at least one or more of the vendor identification data, product identification data and product revision level data to the product serial number, if data from the unit serial number page indicates that the logical unit only supports a single logical unit.

28. The method of claim 26, further comprising
    calling the specialized method, if data from the standard inquiry page indicates that the specialized method is available; and
    generating a UID for the logical unit with the specialized method.

29. The method of claim 26, wherein the querying of the logical unit with the SCSI command, the other SCSI command and the further SCSI command, respectively, each includes requesting the logical unit only for data defined by the SCSI standard.

30. A computer program product comprising a computer-readable medium having computer program logic stored thereon for enabling a processor of the product to generate a unique identifier for one of a plurality of logical units on a small computer system interface (SCSI) device, the computer program logic causing the processor to perform the steps of:
- querying one of the plurality of logical units on the SCSI device with a first command requesting first identifier data;
- determining whether a unique identifier (UID) for the queried logical unit can be constructed based upon the first identifier data, the UID distinguishing uniquely among the plurality of logical units on the SCSI device;
- querying the logical unit with a second command requesting second identifier data, if the UID cannot be constructed from the first identifier data;
- determining whether the UID for the queried logical unit can be constructed based on the second identifier data;
- querying the logical unit with a third command requesting third identifier data, if the UID cannot be constructed from the second identifier data;
- extracting information from the first identifier data and from the third identifier data; and
- generating the UID based on the extracted information.

31. The computer program product of claim 30, wherein one or more of the steps of querying further causes the processor to perform the step of:
- issuing a small computer system interface (SCSI) standard inquiry command requesting a standard inquiry data page.

32. The computer program product of claim 30, wherein at least one of the step of querying the logical unit with the second command and querying the logical unit with the third command further causes the processor to perform the step of:
- issuing a small computer system interface (SCSI) standard inquiry command requesting a logical unit identification vital product data (VPD) page.

33. The computer program product of claim 30, wherein the step of determining whether a UID can be constructed based on any received first identifier data further causes the processor to perform the steps of:
- determining whether there is a match between the first identifier data to an applicable specialized method adapted to uniquely identify the logical unit; and
- generating the UID using the specialized method, if a match exists.

34. The computer program product of claim 30, wherein the step of extracting information further causes the processor to perform the step of:
- extracting at least one or more of vendor identification data, product identification data and product revision level data of the logical unit from the first identifier data; and.
- extracting unit serial number data of the logical unit from the third identifier data.

35. The computer program product of claim 30, the computer program logic further causing the processor to perform the step of:
- selecting an identifier from a list of identifiers in the second identifier data.

36. The computer program product of claim 35, wherein the step of extracting information further causes the processor to perform the steps of
- extracting at least one or more of vendor identification data, product identification data and product revision level data of the logical unit from the first identifier data, and extracting unit serial number data of the logical unit from the third identifier data.

37. The computer program product of claim 36, wherein the step of generating the UID further causes the processor to perform the step of:
- concatenating the extracted information from the first and third identifier data to the selected identifier.

38. The computer program product of claim 30, the computer program logic further causing the processor to perform the step of:
- selecting an identifier from a list of identifiers in the second identifier data.

39. The computer program product of claim 38, wherein the step of generating the UID further causes the processor to perform the step of:
- concatenating the extracted information to the selected identifier to generate the UID for the queried logical unit.

40. The computer program product of claim 30, wherein the steps of querying of the logical unit with the first, second and third commands, respectively, each further causes the processor to perform the step of requesting the logical unit only for data defined by the SCSI standard.

* * * * *